Dec. 3, 1963   R. G. THOMPSON   3,112,768
MULTIPLE PORT VALVE
Filed Feb. 2, 1962

INVENTOR.
RICHARD G. THOMPSON
BY
John E. Stephen
ATTORNEY

United States Patent Office 3,112,768
Patented Dec. 3, 1963

3,112,768
MULTIPLE PORT VALVE
Richard G. Thompson, Stillwater, Minn., assignor to Union Tank Car Company, Chicago, Ill., a corporation of New Jersey
Filed Feb. 2, 1962, Ser. No. 170,696
9 Claims. (Cl. 137—625.5)

This invention relates to multiple port valves and has for its principal object to provide a novel conical disk shaped closure member for a multiple port valve adapted to be flexed to move by snap action from one position to another.

A particular object of the invention is to provide a multiple port valve having a chamber containing a toggle-like annular, flexible closure member of normally conical shape embodying spring means for biasing it toward selected closed positions and adapted to be flexed to alternately close oppositely disposed ports.

Other objects and advantages of the invention will appear and be more fully pointed out in the following specification, having reference to the accompanying drawing.

Referring to the drawing which illustrates, by way of example and not for the purpose of limitation, a preferred embodiment of my valve:

Figure 1:
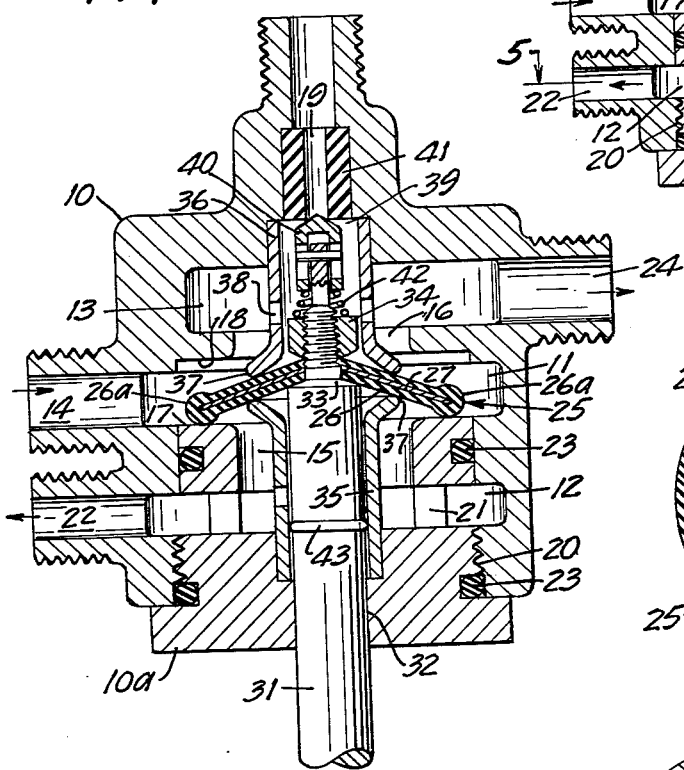
FIGURE 1 is a vertical sectional view showing the closure member in a first position.
Figure 5:
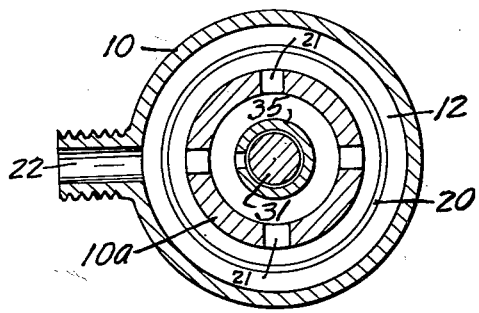
FIG. 5 is a horizontal sectional view taken on the line 5—5 of FIG. 2.

As shown in FIG. 1, the valve has casing members 10 and 10a formed with chambers 11, 12 and 13, an inlet port 14 and outlet ports 15 and 16 communicating with opposite sides of the chamber 11 and connecting it to the chambers 12 and 13 respectively. Oppositely disposed annular valve seats 17 and 18 surround the ports 15 and 16 respectively in the chamber 11 and a fourth port 19 communicates with the chamber 13. The casing member 10a has a threaded connection at 20 with the casing member 10. As best shown in FIG. 5, the casing member 10a is formed with radially extending passages 21 connecting the port 15 to the chamber 12 in the casing member 10. A port 22 is formed in the casing member for flow of fluid to and from the chamber 12. The joint between the casing members 10 and 10a is sealed by a pair of rings 23 which may be of the common O-ring type. Another port 24 extends to the exterior of the chamber 13.

Figure 2:
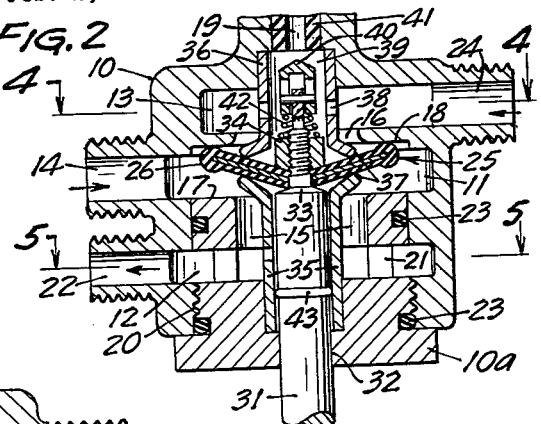
FIG. 2 is a partial vertical sectional view showing the closure member in a second position.
Figure 3:
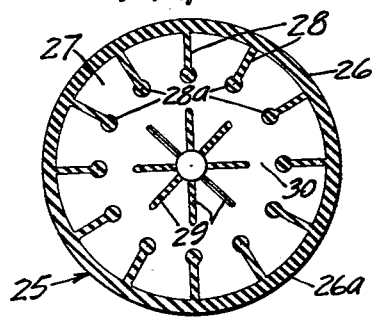
FIG. 3 is a substantially horizontal sectional view of the closure member.

An important feature of the present invention is an annular closure member indicated generally at 25 which is spring biased to conical disk shape and adapted to be sprung from a closed position on one of its seats to a closed position on an oppositely disposed seat. Specifically member 25 is flexible and adapted to be sprung from the position shown in FIG. 1 to that shown in FIG. 2 to alternately close the port 15 and port 16. This closure member comprises an annular body 26 of flexible elastic rubber-like material carrying an internal spring disk 27 shown in detail in FIG. 3. The disk 27 is preferably formed from thin spring metal, e.g., Phosphor bronze, and is laminated between layers of rubber-like member 26 and completely encased therein. To provide the desired flexibility and snap action, two series of radially extending slots, indicated at 28 and 29 respectively (FIG. 3) are formed in the spring disk 27. A series of regularly spaced radial slots 28 are spaced radially outward from the series of slots 29 so that there is a continuous annular imperforate zone 30 of the disk located at a radius from the axis of the disk corresponding to that of the fulcrum means hereinafter described. This material from which the disk 27 is formed must be thin and flexible but relatively less compressible and elastic than the material of the body 26. Arcuate enlargements 28a of the slots 28 are formed at their inner ends to distribute and relieve the stress locally when the disk is flexed from one conical position to another. At its outer periphery the body 26 is formed with an annular lip 26a which projects at opposite faces of the closure member for contact with the seats 17 and 18.

A coaxial valve stem 31 is connected to the closure member 25 and is movable in a bearing 32 formed in the casing member 10a. At its lower side the closure member 25 engages an annular shoulder 33 formed on the stem 31, and at its upper side a nut 34, having a threaded connecting with a reduced portion of the stem confines the closure member on the stem. Tubular fulcrum members 35 and 36 are fixed in the casing members 10a and 10 respectively and have rounded ends 37 which make contact with the member 25 at annular zones which are spaced radially outward from the axis of the closure member and radially inward from its outer periphery. By this arrangement of stem and fulcrum members, the annular closure member 25 is caused to snap from the position indicated in FIG. 1 to that shown in FIG. 2 when the stem is pulled downwardly, and is caused to return, with a snap action, from the position shown in FIG. 2 to that shown in FIG. 1 when the stem is pushed upward. This snap action is caused by the tendency of the spring disk 27 to retain its conical form and by the elasticity of the rubber-like body 26 of the closure member. Thus when the closure member is flexed from one conical position to the other, the elastic material of the body 26 is stretched or expanded in the radial slots 28 and compressed in the radial slots 29 as this member passes its dead center or horizontal, flat position between the fulcrum members 35 and 36.

Figure 4:
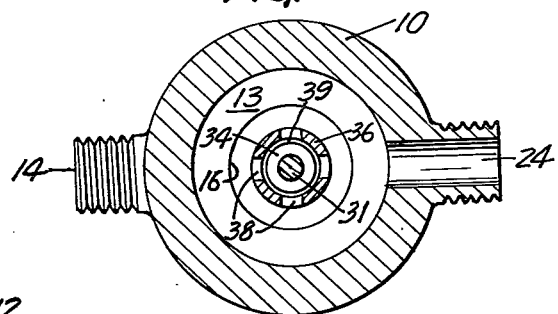
FIG. 4 is a horizontal sectional view taken on the line 4—4 of FIG. 2.

As best shown in FIG. 4, the tubular fulcrum member 36 is formed with radially extending passages 38 for flow between the chamber 13 and a chamber 39 formed in the upper portion of the casing 10 and tubular member 36. A closure head 40 is mounted on the upper end portion of the stem 31 to close the port 19 when the valve is in the position shown in FIG. 1. To open the port 19 the valve is moved to the position shown in FIG. 2. A resilient tubular flow restricting member 41 is contained in the port 19 and has a lower end which affords a seat for the member 40. To insure the simultaneous seating of the head 40 and the closure of the member 25 at its seat 17, a suitable lost motion connection is provided between the head 40 and the stem 31, and a coiled spring 42 is arranged to bias the head 40 toward its upwardly extended position. To prevent leakage along the stem 31 of the chamber 12, an O-ring seal 43 is mounted on the stem and is normally under compression against the inner surface of the tubular fulcrum member 35.

It will be evident that the normally conical member 25 may be formed in a conical mold in which the conical spring disk 27 is supported as an insert, the material of the elastic body 26 being injected while in a fluid state. A rubber or rubber-like material having the desired elasticity and durability is used.

Either manually or power actuated means may be connected to the stem 31 to operate the valve. Since only a momentary application of force is required to snap the valve from one position to another, momentarily energized electro-magnetic means, an electric or spring actuated motor, or fluid pressure responsive means or a combination of electro and fluid pressure responsive means may be used to operate the valve.

My improved valve is characterized by a number of advantageous features among which the following may be noted: When the closure member has been set in either of the selected positions no external force is required to retain it in sealing relation to its seat. This conical disk member is compact, simple, reliable in operation, and only a momentary application of force to the stem is required to move the closure member from one position to the other. Being biased toward the selected closed position, there is no tendency for the valve to remain in partially open position in relation to its seats. This valve is also adapted to control flow from an inlet chamber to additional outlet ports, such as the ports 19, 22 and 24.

I claim:
1. A multiple port valve comprising:
   (a) casing means defining a chamber, an inlet port, a plurality of outlet ports communicating with said chamber, and first and second oppositely disposed annular valve seats surrounding selected outlet ports in said chamber;
   (b) an annular closure member disposed in said chamber to selectively close at said seats, said closure member comprising an annular body of flexible material having an axis concentrically disposed to said seats and outer peripheral surfaces for contact with said valve seats respectively;
   (c) spring means carried by said body for biasing it toward substantially conical form with said peripheral surfaces projecting alternately at opposite sides of the central portion of said body;
   (d) valve actuating means connected to the central portion of said closure member, and movable to actuate said closure member selectively from a position closing one of said outlet ports to a position closing the other of said outlet ports, and
   (e) fulcrum means in said chamber for contact with opposite sides respectively of said closure member, said fulcrum means being concentrically disposed to the axis of said member and spaced radially outwardly from said axis and radially inwardly from said outer peripheral surfaces of said member.

2. A valve in accordance with claim 1 in which said annular body comprises a normally conical disk of elastic material.

3. A valve in accordance with claim 2 in which said outer peripheral surfaces of said body for contact with said valve seats are formed on a peripheral lip of toric form projecting at both sides of said body.

4. A valve in accordance with claim 1 in which said spring means comprise a thin flexible disk having substantially radially slotted annular zones imparting radial flexibility in directions parallel to said axis.

5. A valve in accordance with claim 4 in which said thin disk is laminated between layers of flexible elastic material.

6. A valve in accordance with claim 4 in which said annular radially slotted zones of said disk are radially spaced apart one from the other by an annular imperforate zone of said disk having a radius corresponding to the radius of said fulcrum means from the axis of said body.

7. A valve in accordance with claim 1 in which said fulcrum means comprise coaxial tubular members having ends confining said annular closure member between them.

8. A valve in accordance with claim 7 in which said coaxial tubular members have outwardly flaring ends for contact with opposite surfaces of said annular body.

9. A valve in accordance with claim 1 in which said casing means have a bearing for a valve stem, and said valve actuating means comprise a coaxial stem movable longitudinally in said bearing.

References Cited in the file of this patent
UNITED STATES PATENTS

| 2,893,416 | Hegstad | July 7, 1959 |
| 3,069,125 | Hewitt | Dec. 18, 1962 |